United States Patent Office 2,912,852
Patented Nov. 17, 1959

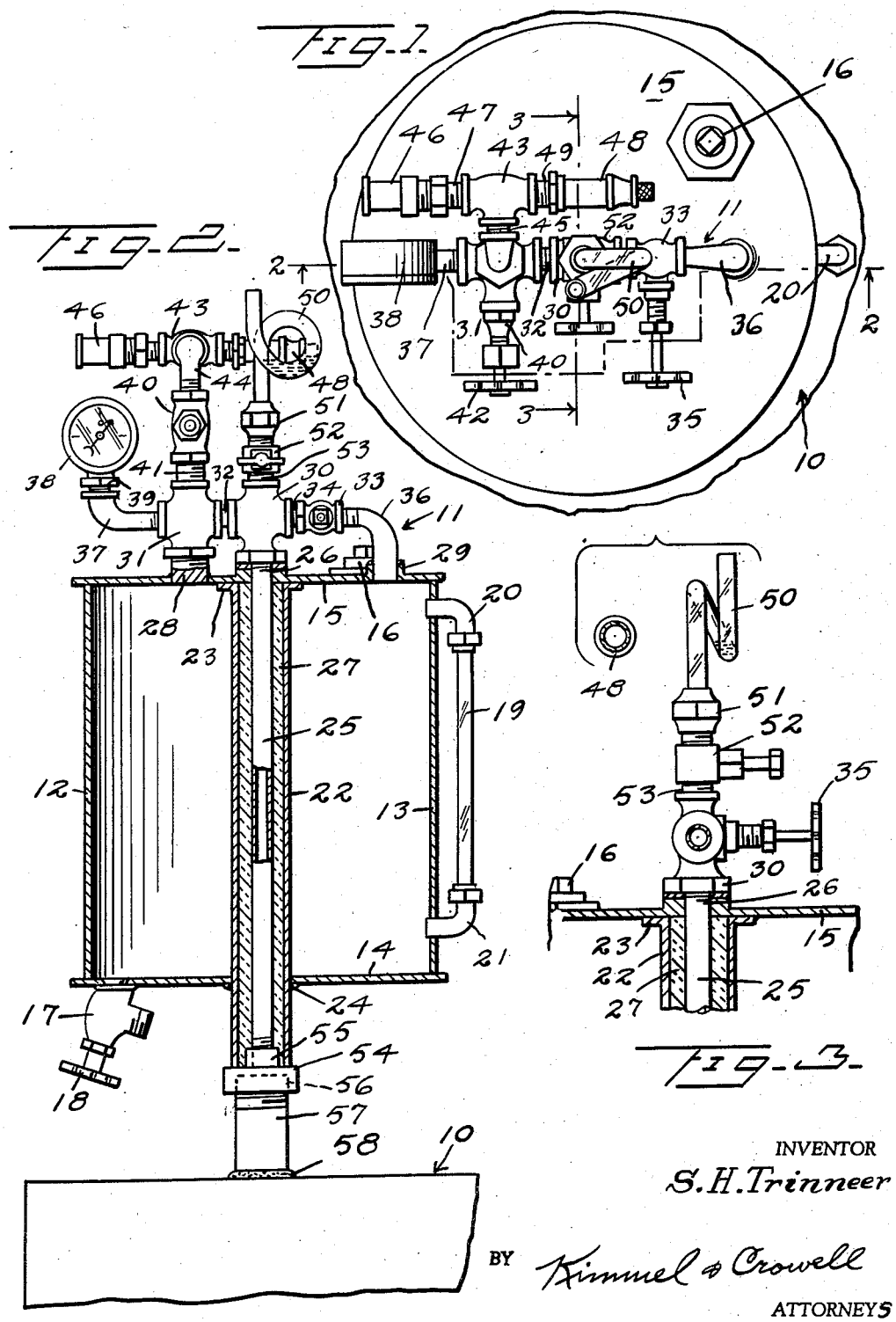

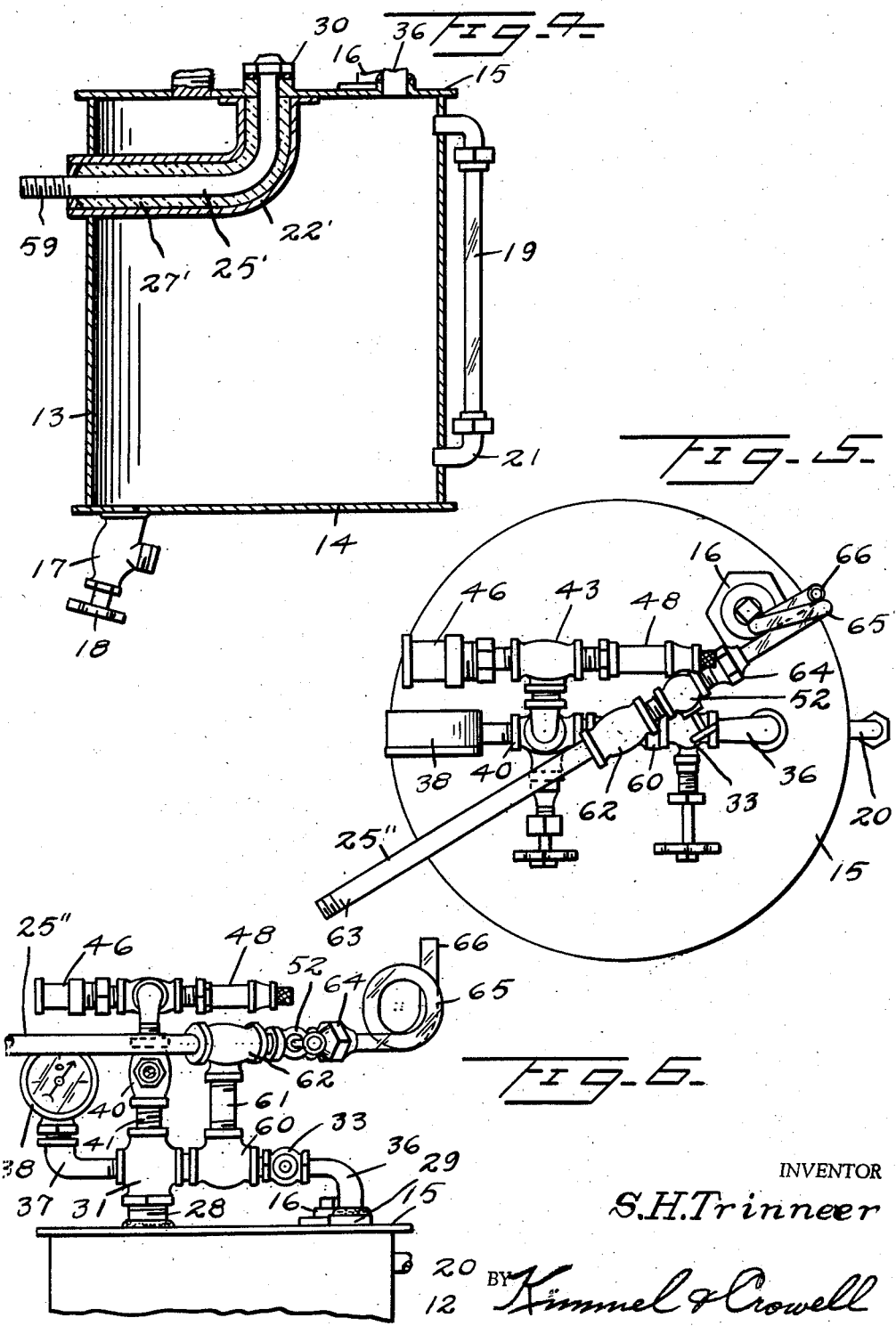

2,912,852

TANK TESTING DEVICE

Stephen H. Trinneer, Aberdeen, Wash.

Application August 15, 1955, Serial No. 528,376

1 Claim. (Cl. 73—49.2)

The present invention relates to devices for testing tanks, and more particularly for testing tanks for leakage under either a negative or positive pressure condition.

The primary object of the invention is to provide a structure by which a tank may be tested both under positive pressure conditions and, without modifying the test equipment, also under negative pressure conditions.

Another object of the invention is to provide a structure of the class described in which both large and minute leaks may be detected without modifying the structure of the test equipment.

A further object of the invention is to provide a tank testing device which utilizes the vacuum created by the normal oil flow from the tank.

A still further object of the invention is to provide a tank testing device which utilizes the vacuum from the intake manifold of an internal combustion engine to assist in the test.

A further object of the invention is to provide a test device for testing leakage in tanks which can be attached permanently to the tank under test, or be carried from tank to tank as a portable tank tester.

A still further object of the invention is to provide a structure of the class described in which the pressures required for the test can be obtained from an outside source and from a primer tank connected to the system.

Other objects and advantages will become apparent in the following specification when considered in light of the attached drawings, in which:

Figure 1 is a top plan view of the invention shown attached to a tank being tested, with parts thereof broken away;

Figure 2 is a vertical cross section taken along the line 2—2 of Figure 1, looking in the direction of the arrows;

Figure 3 is a fragmentary detailed sectional view of the indicator tube and its connection to the tester taken along the line 3—3 of Figure 1, looking in the direction of the arrows;

Figure 4 is a vertical cross section of a modified form of the invention, partly broken away;

Figure 5 is a top plan view of another modified form of the invention;

Figure 6 is a side elevation of the invention disclosed in Figure 5 with parts broken away.

Referring now in detail to the drawings, wherein like reference numerals indicate like parts throughout the several figures, the reference numeral 10 indicates generally a tank upon which the test device, generally indicated at 11, is connected for test purposes. The test device 11 includes a primary tank 12 having a cylindrical side wall 13, a bottom wall 14 and a top wall 15. Top wall 15 of the tank 12 is provided with a filler plug 16 by means of which the tank may be filled. The bottom wall of the tank 12 is provided with a valved outlet 17 controlled by a hand wheel 18 by means of which the tank 12 may be drained when desired. A glass level gauge tube 19 is operatively connected at the upper end thereof to the tank 12 by means of a fitting 20 and is operatively connected at its lower end of the tank 12 by a fitting 21 so that fluid in the tank 12 will also rise in the tube 19 to an equal level indicating the liquid content of the tank 12.

A centrally disposed vertically extending tube 22 is secured to the top wall 15 of the tank 12 by means of a circumferentially extending flange 23 which is welded, or otherwise mounted, on the top wall 15. Tube 22 passes through the bottom wall 14 and is sealed thereto by means of welding as at 24. A pipe 25 extends through the tube 22 in spaced apart relation thereto with the upper end 26 of the pipe 25 passing through the top wall 15 and provided with screw threads in the outer surface thereof. The pipe 25 extends below the bottom wall 14 of the tank 12. Insulation 27 is packed into the tube 22, surrounding the pipe 25 so that the pipe 25 is insulated against heat and cold with relation to the tank 12. The top wall 15 of the tank 12 is provided with an upstanding, externally threaded mounting stud 28 on one side thereof and on the opposite side provided with an open boss 29 communicating with the tank 12. A four-way pipe fitting 30 having four communicating, internally threaded openings extending therefrom is threaded onto the top threaded end 26 of the pipe 25. A second four-way pipe fitting 31 is threadedly secured to the upstanding threaded mounting stud 28. A threaded nipple 32 is positioned between the four-way connectors 30 and 31 and connects the adjacent faces thereof together. A valve 33 is connected by means of a nipple 34 to the four-way pipe fitting 30 on the side opposite the nipple 32. The valve 33 is of a conventional construction and is adapted to be operated by the hand wheel 35. An elbow 36 is threadedly attached to the valve 33 and is secured to the boss 29 by welding or the like. A street elbow 37 is threaded into the four-way fitting 31 on the side opposite the nipple 32, the opposite end of the street elbow 37 has a pressure gauge 38 operatively connected thereto by mans of a nipple 39. Pressure gauge 38 is of the zero centering type and is calibrated in positive pounds of pressure in a clockwise direction, and in negative pounds of pressure in a counterclockwise direction.

A valve 40 of conventional construction is operatively connected to the top of the four-way fitting 31 by means of a nipple 41. Valve 40 is controlled by a hand wheel 42. A T 43 is connected to the side of the valve 40 opposite the nipple 41 by means of a street elbow 44 and a nipple 45. A check valve containing air hose connecter 46 is connected to the T 43 by means of a nipple 47, and a high pressure relief valve 48 is connected to the opposite side of the T 43 by means of a nipple 49. Both the connector 46 and the relief valve 48 are of conventional construction. A transparent liquid-containing indicator tube 50 is connected by means of a fitting 51 to a valve 52. A nipple 53 connects the valve 52 to the side of the four-way fitting 30 opposite its connection to the pipe 25.

The tube 22 is closed at its lower end by a member 54 which is provided with an upstanding internally screw-threaded boss 55. The member 54 has an enlarged internally threaded bore 56 opening from the lower face thereof and in communication with the internally threaded boss 55. The pipe 25 is threaded into the boss 55 and the tank 10 is connected to the large bore 56 of the member 54 by means of an upstanding threaded nipple 57 which is secured to the tank 10 at the bottom edge thereof by means of welding 58 or the like.

In Figure 4 of the drawings a modified form of the invention is disclosed wherein the tubing 22' is bent at right angles from its point of attachment to the top wall 15 of the tank 12 and extends through the side wall 13 of the tank adjacent the top wall 15. A pipe 25' extends through the tubing 22' in spaced apart relation thereto. The space between the pipe 25' and the tubing 22' is packed with insulation 27' insulating the pipe 25' against heat and cold from the interior of the tank 12. The outer end of the pipe 25' is screw-threaded as at 59 so that the pipe 25' might be connected to a tank (not shown) to be tested. The structure of the pipe fittings and other members connected to the top wall 15 of the tank 12 is identical in this modification with the preferred form, as disclosed in Figures 1 to 3.

In Figures 5 and 6 of the drawings there is disclosed a modification wherein the top wall 15 of the tank 12 is provided with a threaded stud 28 supporting a four-way connector 31 and an elbow 36 connected to a boss 29, all in the same manner as the preferred form. A valve 33 is connected to the elbow 36 and a T 60 is positioned between the valve 33 and the four-way pipe fitting 31 and connected thereto by means of nipples 32 and 34. A nipple 61 connects a center outlet of the T 60 to the center outlet of a T 62. A pipe 25" extends from the T 62 and is screw-threaded at 63 on its outer end for connection to a tank (not shown) to be tested. A valve 52 is connected to the T 62 at the end opposite to the pipe 25" and carries a fitting 64 which is connected to the valve 52 on the side opposite its connection to the T 62. An indicator tube 65 extends from the fitting 64 and is formed of transparent material in the same general manner as the indicator 50 in the preferred form of the invention, with the exception that the end of the tube 66, open to the atmosphere, extends at right angles to its opposite end.

This modification is provided with identical pressure gauge 38, valve 40, connector 46, pressure relief valve 48, and inlet plug 16, which are all operatively connected in the same manner as in the preferred form as illustrated in Figures 1 through 3.

In the use and operation of the invention the pipe 25, or the pipes 25' and 25" of the modifications, are connected so as to communicate with the interior of the tank 10. An air hose (not shown) is connected to the connector 46 and at its opposite end to the source of air pressure (also not shown). The valve 52 is closed along with the valve 33, while the valve 40 is open so that air pressure may pass therethrough and into the tank 10. After the tank has been brought up to pressure, the pressure gauge 38 is observed to determine if any major leaks exist in the tank 10 which will result in drops in pressure, which will be indicated on the pressure gauge 38. In the event that this test does not uncover a leak, the air hose can then be connected to a source of negative pressure and with the valve 52 closed and the valves 40 and 33 open, a tank 10 is evacuated along with the tank 12. After evacuating air from the tank 10, the valve 40 is closed and the pressure gauge 38 is observed to determine if any pressure increases occur which could only happen in the case that air is permitted to enter the tank 10 through a leak. This method would uncover any large leaks in the tank 10. However, should it be desirable to check further for small leaks, the valve 52 is opened, permitting atmospheric air entering the open end 66 of the tube 65 to pass through the fluid contained in the indicator tube 50 or 65 in the case of the modification illustrated in Figures 1 and 5. Until the pressure within the tank 10 is balanced with the pressures of the atmosphere, further leakage of the fluids from the tank 10 will result in a decrease of the pressure in the tank 10 and cause additional air to pass through the liquid in the indicator tubes 50 and 65. Air passing through the liquid will appear as bubbles and can be observed by the operator.

In the event that additional negative pressures are desired beyond that which can be obtained from the source of negative air pressure, the tank 12 can be filled with water by removing the filling plug 16. After the filling plug 16 is replaced the valve 17 can be opened by means of the hand wheel 18 and by draining a portion of the water from the tank 12, the pressure on the tank 10 can be reduced to a lower point prior to conducting the test with the pressure gauge 38 and/or the indicator tubes 50 or 65. It has been found that rapid changes in air pressure within the tank 12 often causes considerable changes in the temperatures thereof and hence the pipe 25 is insulated by means of insulation 27 to prevent the pipe 25 from becoming frozen.

Having thus described the preferred embodiments of the invention, it should be understood that numerous structural modifications may be resorted to without departing from the scope of the appended claim.

What is claimed is:

In a device of the class described a pipe, means for connecting one end of said pipe to an object to be tested, a primer tank having said pipe extending therethrough, means insulating said pipe within said primer tank, a pipe fitting mounted on the opposite end of said pipe, a first valve having one side connected to said pipe fitting, means connecting the other side of said first valve to said primer tank, a second valve having one side connected to said pipe fitting, a transparent liquid containing indicator tube having one end connected to the other side of said second valve and the opposite end thereof open to the atmosphere, a third valve having one side thereof connected to said pipe fitting, and means for detachably connecting the other side of said third valve selectively to a source of air under positive pressure and to a source of air under negative pressure whereby the object to be tested is initially filled with air under positive pressure and sequentially is evacuated along with said primer tank to provide a complete negative and positive pressure check.

References Cited in the file of this patent

UNITED STATES PATENTS

| | | |
|---|---|---|
| 2,270,447 | Jones et al. | Jan. 20, 1942 |
| 2,493,967 | Hendricks | Jan. 10, 1950 |
| 2,534,158 | Annin | Dec. 12, 1950 |